United States Patent
Zhang

(10) Patent No.: US 11,494,964 B2
(45) Date of Patent: Nov. 8, 2022

(54) 2D/3D TRACKING AND CAMERA/ANIMATION PLUG-INS

(71) Applicant: Sony Interactive Entertainment LLC, San Mateo, CA (US)

(72) Inventor: Xinyu Zhang, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 35 days.

(21) Appl. No.: 17/221,704

(22) Filed: Apr. 2, 2021

(65) Prior Publication Data

US 2022/0319087 A1 Oct. 6, 2022

(51) Int. Cl.
| | |
|---|---|
| *G06T 13/40* | (2011.01) |
| *G06T 13/80* | (2011.01) |
| *G06T 15/04* | (2011.01) |
| *G06V 40/20* | (2022.01) |
| *G06V 40/10* | (2022.01) |
| *G06V 40/16* | (2022.01) |

(52) U.S. Cl.
CPC ............. *G06T 13/40* (2013.01); *G06T 13/80* (2013.01); *G06T 15/04* (2013.01); *G06V 40/103* (2022.01); *G06V 40/176* (2022.01); *G06V 40/23* (2022.01)

(58) Field of Classification Search
None
See application file for complete search history.

(56) References Cited

U.S. PATENT DOCUMENTS

2009/0091563 A1\* 4/2009 Viz .................. G06T 13/40
345/419

\* cited by examiner

*Primary Examiner* — Michael J Cobb
(74) *Attorney, Agent, or Firm* — Penilla IP, APC

(57) ABSTRACT

Methods and systems for re-mastering animation files used in a video game includes identifying a rig used for representing a virtual character of the video game. Virtual markers are applied to the rig to generate a modified rig. Animation files for the virtual character are executed using the modified rig and a virtual camera is activated to capture images of the animation of the modified rig. Images of the modified rig are used to define performance data. The performance data is applied to a new rig of the virtual character to generate re-mastered animation files. The re-mastered animation files are used in the video game to generate gameplay data.

20 Claims, 7 Drawing Sheets image of character 1 image of character 1 image of character 2 image of character 2 image of object 1 image of object 1

ID/3D TRACKING AND
CAMERA/ANIMATION PLUG-INS

TECHNICAL FIELD

The present disclosure relates to providing animation tools for re-mastering animation files of virtual characters used in a video game.

BACKGROUND OF THE DISCLOSURE

Online video games have increased in popularity over recent years. Game developers have been taking advantage of the popularity of these online games and providing more and more of the video games online, including old games that are still popular with the users. However, these old games were developed using legacy tools and therefore include graphics, sound and content that are not of the high quality of the games developed using current tools. In order to provide quality content, the old games are often re-mastered to improve the graphics, sound, and content. When the old games are re-mastered, oftentimes a human actor is used to perform certain emotions and actions, which are captured using one or more cameras. Typically, the actor wears markers on their face and body and then moves and performs expressions, which are captured by the cameras. Images of the actor captured by the cameras are used to extract skeletal motions and expressions. In order to capture the fine details on the face of an actor, the actor is sometimes required to wear a head rig that has a camera facing the actor's face. The cameras used to capture the facial features are typically two-dimensional cameras. Once skeletal motions and expressions are extracted, a solver is utilized to apply the extracted motions and expressions to move the face of a rig representing the character and perform specific animation. Additional fine-tuning (e.g., facial feature cleaning) may have to be performed to remove abnormalities or adjust specific facial features. Then, the associated rig of the character is animated.

The aforementioned process of re-mastering a specific game title to simply improve the graphics is manual, labor-intensive, very time-consuming and has its own disadvantages. One of the disadvantages may be related to mismatch in the placement of the markers. For example, using an actual actor to re-create the expressions of a specific character within the video game would require the actor to be in front of the camera for hours and sometimes may extend to multiple sessions in order to capture the different expressions that can be expressed for different circumstances (i.e., context) of the video game. When multiple sessions are scheduled, the placement of the markers needs to be precise from one session to the next so that the expressions can be correctly captured by matching the markers to relate the images from one session to another. Any mismatch in the placement of the markers would lead to expressions of the actor not being correctly recognized. Another disadvantage is related to the markers. Typically, the markers are physical dots or paints that are provided on the face of the actor. However, when the actor is performing actions or expressions, the physical markers may wear off, drift away, etc., due to movement of the head of the actor, sweating or for any other reasons. These variations in the physical markers on the face of the actor may lead to incorrect interpretation of the expressions captured for the actor by the cameras or may lead to wasted time in having to re-orient the physical markers in the appropriate locations on the face of the actor. Additionally, when the head mounted cameras (HMCs) are used, the HMCs may cause stabilization issues. For instance, when the actor is wearing HMC, the camera moves with the movement of the actor's head due to the coupling of the camera to the head. Sometimes, the movement of the camera may not fully synchronize with the movement of the head, thereby causing a difference in the perspective of the facial expression in relation to the head movement.

It is in this context that embodiments of the disclosure arise.

SUMMARY

Embodiments of the present disclosure relate to systems and methods for re-mastering old video games to improve the graphics, sound and content. The various embodiments described herein use a virtual camera within a virtual scene of the online game to capture expressions of a virtual character. The virtual camera is oriented to face the virtual character to capture images of facial features of the virtual character. Virtual markers are applied on the face of a rig representing the virtual character. Animation files related to the virtual character are identified and executed. The virtual camera is activated to capture the images of expressions on the face of the virtual character as the animation files are being executed, wherein the images are captured by tracking the virtual markers. The captured images are interpreted to determine the expressions exhibited on the face of the virtual character. The expressions are then applied to a new rig defined for the virtual character to define re-mastered animation files for the virtual character. The new rig includes finer bone structure and mesh to include intricate details of the facial features of the virtual character and the re-mastered animation files capture the animation of the expressions and motion in finer detail. The re-mastered animation files are used during runtime of the video game to generate gameplay data for the video game.

Using virtual camera to capture animation of the virtual character avoids the stabilization issues that are usually present when physical camera is worn on the head of an actor (part of the head mounted device) performing the expressions. This is because the virtual camera is de-coupled from the head movement of the virtual character. Further, the virtual markers provided on the rig representing the virtual character are in fixed positions on the virtual character's face and are not subject to drifting or dislocation or discoloring or fading due to sweating or movement of the head of the virtual character. The virtual camera can be activated any time to automatically capture the expressions on the face of the virtual character. There is no need for scheduling actors to perform the animation and does not need manual effort to capture the images. Manual re-mastering of the old video games required identifying actors matching the physical attributes of the virtual character and scheduling these actors. When the number of virtual characters within the video game is too many, this task can be daunting with respect to time and labor.

The virtual camera simplifies the process of capturing the expressions of the virtual characters. The virtual camera is disposed within a virtual scene so as to cover a three-dimensional (3D) view of a virtual character within its field of view, and the field of view is directed at the face of the virtual character to capture the expression on the virtual character's face. Data related to the animation of the virtual character's face captured by the virtual camera is applied to a new rig defined for the virtual character to generate re-mastered animation files. During application of the animation, adjustments are made to fine tune the facial expressions on the new rig. For instance, the animation processor can make simple adjustments to the different vertices of the face, apply texture and/or color to the captured facial features. The fine-tuned expressions of the virtual character are captured in the re-mastered animation files. The re-mastered animation files of plurality of virtual characters are used, during runtime of the video game to generate gameplay data. The images of the virtual characters included in the gameplay data of the video game title are better in quality than the files developed using legacy tools. In addition to capturing 3D views, the virtual camera may also capture two-dimensional (2D) view of the virtual character and use the 2D view to generate animation files for the virtual character. The re-mastering of files for the video game title using the virtual camera use less time, are less labor intensive, and provide more consistent images than the manual process.

In one implementation, a method for re-mastering animation files used in a video game, is disclosed. The method includes identifying a rig used for representing a virtual character of the video game. Virtual markers are applied to a face of the rig representing the virtual character, to generate a modified rig. Animation files for the virtual character of the video game are retrieved and executed to capture animation of the virtual character represented by the modified rig. A virtual camera is activated to capture images tracking the virtual markers on the face of the modified rig to define performance data, wherein the performance data tracking the virtual markers capture changes to facial features of the modified rig as the animation files of the virtual character are being executed. The performance data captured by the virtual camera are applied to a new rig defined for the virtual character to generate re-mastered animation files for the virtual character. The re-mastered animation files of the virtual character are stored for subsequent retrieval by a game engine for generating gameplay data for the video game during gameplay of the video game. The gameplay data includes the re-mastered animation files expressing animation of the virtual character in high fidelity.

In one implementation, the performance data tracks expression data and virtual marker data pertaining to the virtual character. The tracking is used to determine changes in expression of the virtual character.

In one implementation, the images in the performance data are captured as two-dimensional images and three-dimensional images.

In one implementation, activating the virtual camera includes controlling a field of view of the virtual camera so as to be oriented toward the face of the modified rig representing the virtual character.

In one implementation, controlling the field of view includes adjusting the field of view of the virtual camera so as to synchronize with movement of the face of the virtual character during execution of the animation files. The adjusting enables the virtual camera to capture images of the virtual markers applied on the face of the modified rig.

In one implementation, the gameplay data for the video game is generated by identifying and applying the re-mastered animation files generated for a plurality of virtual characters of the video game. The gameplay data of the video game captures changes in expression of the plurality of virtual characters in high fidelity.

In one implementation, the performance data includes two-dimensional data and three-dimensional data.

In one implementation, the re-mastered animation files are generated by extracting the two-dimensional data from the performance data and applying the two-dimensional data to the new rig identified for the virtual character to generate the re-mastered animation files for the virtual character. The extracting and applying is done using a two-dimensional solver.

In one implementation, applying the performance data includes enhancing the facial feature of the virtual character in the new rig by applying color and texture to the facial features of the virtual character.

In one implementation, applying the performance data includes blending one or more shapes to the facial features captured in the new animation files of the virtual character. The one or more shapes are identified and used to correct depth related attribute of the facial features of the virtual character captured by the virtual camera.

In one implementation, the new animation files are defined by extracting three-dimensional data from the performance data. The three-dimensional data is applied to the new rig defined for the virtual character to generate the re-mastered animation files for the virtual character, wherein the re-mastered animation files include depth. The extraction and application is done using a three-dimensional solver.

In one implementation, the re-mastered animation files are generated by creating a model using machine learning algorithm. The model is trained using linear regression to detect and include drift in the expression of the virtual character.

In an alternate implementation, a method for re-mastering animation files for a plurality of virtual characters used in a video game, is disclosed. The method includes, for each virtual character, identifying a rig used for representing the virtual character; applying virtual markers to a face of the rig representing the virtual character to generate a modified rig; executing animation files retrieved for the virtual character of the video game to capture animation of the virtual character represented by the modified rig; activating a virtual camera to capture images of the animation expressed on the face of the modified rig of the virtual character as the animation files of the virtual character are being executed, to obtain performance data, the performance data of the virtual character capture changes to facial feature of the modified rig; applying the performance data to the new rig defined for the virtual character to generate re-mastered animation files for the virtual character, wherein the new rig is an fidelity rig, in that the new rig includes improved three-dimensional expression shapes, improved vertex amount of each shape, improved control setup, improved transitional in-between shapes, and improved texture and mapping details. The re-mastered animation files are stored for subsequent retrieval by a game engine. The method also includes, responsive to a request for gameplay of the video game, retrieving the re-mastered animation files of the plurality of virtual characters of the video game; and generating the gameplay data for the video game with the retrieved re-mastered animation files. The gameplay data captures animation of each of the plurality of virtual characters of the video game in high fidelity. The animation of the virtual characters includes improved resolution (pixel-wise resolution) and provides more realistic static facial expressions and dynamic movements.

In another implementation, a system for re-mastering animation files used in a video game is disclosed. The system includes an animation processor, a solver and a game engine of the video game. The animation processor is configured to identify a rig used for representing a virtual character of the video game; apply virtual markers to a face of the rig to generate a modified rig for the virtual character; execute animation files retrieved for the virtual character of the video game to capture animation on the modified rig representing the virtual character; and activate a virtual camera to capture images of the animation expressed on the face of the modified rig as the animation files of the virtual character are being executed, to generate performance data. The performance data capturing animation of the virtual character is provided to the solver. The solver is configured to apply the performance data to a new rig defined for the virtual character to generate re-mastered animation files for the virtual character, wherein the new rig defined for the virtual character is a high fidelity rig. The re-mastered animation files of the virtual character are stored for subsequent retrieval. The game engine is configured to retrieve the re-mastered animation files of the virtual character of the video game and generate gameplay data using the re-mastered animation files of the virtual character. The gameplay data for the video game captures animation of the virtual character of the video game in high fidelity.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

Figure 1:
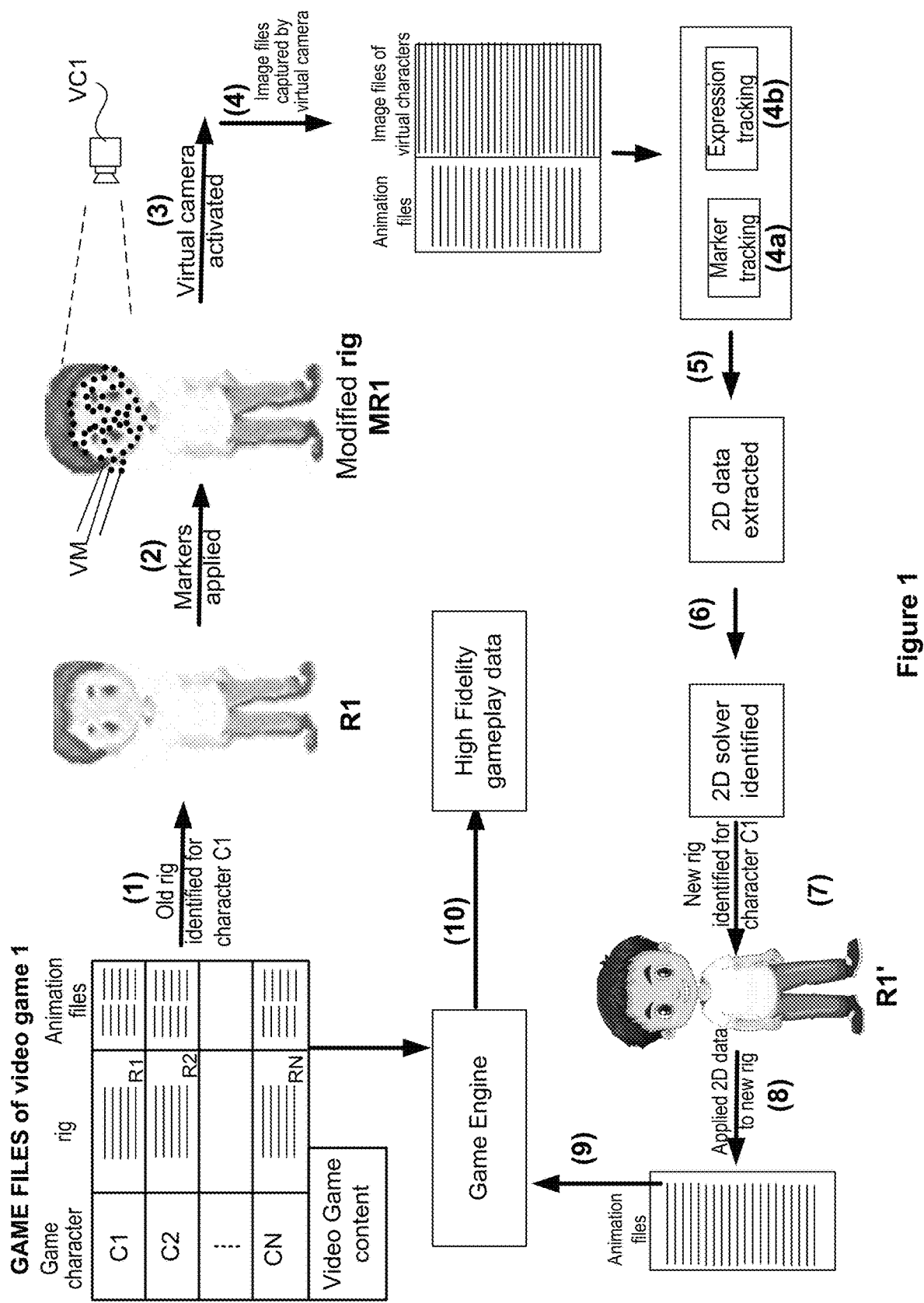
FIG. 1 illustrates a simplified process flow for re-mastering a video game, in accordance with one implementation of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

A video game title includes graphics, content, and sound, which are controlled by the game code based on input from a user. Earlier developed video game titles include the sound, content and graphics that are sub-par in quality. As users continue to use these video game titles, it would be advantageous to improve the quality of the graphics so that the users selecting a video game title for gameplay will be presented with graphics that are of improved quality, thereby allowing the users to have a satisfying game play experience. To improve the quality of the graphics of the video game title, the graphics have to be re-mastered. The graphics included in the video game title (or simply referred to as "video game") correspond to virtual characters that are controlled by the players (i.e., users playing the video game) and virtual scenes in which the virtual characters interact. Improving the graphics of the virtual characters using the latest tools and presenting the improved graphics of the virtual characters during game play greatly improves the quality of the content presented to the users.

One way of improving the graphics associated with a virtual character is by hiring actors, capturing the expressions provided by the actors, and applying the captured expressions to a rig defined for the virtual character. This method of using actors to generate the expressions of the virtual characters has its own disadvantages. For one, it is time consuming, labor intensive, and requires lots of organization to schedule the right type of actors for representing the different virtual characters used in the video game. For instance, an actor hired to represent the virtual character has to have physical characteristics that match the physical characteristics of the virtual character. Once the actors are hired, visual markers have to be applied to the face of the actors and images tracking the visual markers have to be captured as the actors are providing the animation representing the different expressions. The markers have to be applied on the face of the actor in a consistent manner, especially when the actors have to extend their acting to multiple sessions. The captured images have to then be analyzed to determine the changes to facial features of the actors as the actors are performing the different expressions defining the animations. The results from the analysis are then applied to a rig representing the virtual character to generate re-mastered animation files wherein the virtual characters are shown to provide the same expressions.

Re-mastering the files of a video game using real actors is a manual, time-consuming, and labor intensive process that is prone to errors. Usually the errors occur due to mismatch in the placement location of the visual markers, drifting of the visual markers from the original position during acting due to the actor sweating or moving their heads when performing the animation, etc. Additional errors may be introduced in subsequent sessions due to misplacement of the visual markers. As a result of such misplacement, the marker tracking may result in misconstruing or misinterpreting the image data captured of the actor. Further, when the images of the visual markers on the actor are tracked using a camera fitted to the head of the actor (e.g., head mounted camera (HMC)), stabilization issues may occur resulting in a difference in the perspective of the facial expression in relation to the movement of the head of the actor. The stabilization issue may occur due to the camera being coupled to the head of the actor but not fully synchronized with the head movement of the actor.

In order to avoid introducing such errors and to improve the quality of the graphics of a virtual character of the video game, virtual characters used in the video game are animated and images of the virtual character are captured using a virtual camera disposed within a virtual scene of the video game. The virtual camera is de-coupled from the head of the virtual character and is disposed to face the virtual character. Further, the movement of the virtual camera is controlled to synchronize with the movement of the head of the virtual character, thereby avoiding any stabilization issues due to coupling while ensuring the virtual camera captures all the details of the facial features of the virtual character. Animation files related to the virtual character of the video game are identified and executed. During execution of the animation files, the virtual camera is activated to capture the expressions on the face of the virtual character. The virtual camera is configured to track virtual markers placed on the face of a rig representing the virtual character in order to detect changes to facial features of the rig. In addition to placing the virtual markers on the face of the rig to track the facial features, additional virtual markers may be applied to other parts of the body of the rig to track those parts of the body. Images captured by the virtual camera are used to define performance data. The performance data capturing the animation is then applied to a new rig defined for the virtual character to generate re-mastered animation files for the virtual character. The new rig is a high fidelity rig and the application of the performance data results in the new rig exhibiting the same expressions as the original rig but with improved graphics (i.e., improved pixel-wise resolution, realistic static facial expressions and dynamic movements, etc). When the video game is selected by a user for gameplay, the re-mastered animation files for the virtual character are used to generate the gameplay data. The gameplay data of the video game with the re-mastered animation files of the virtual character is generated in real-time during gameplay and forwarded to a client device of the user for rendering, in response to inputs provided by the user.

The re-mastered animation files for the virtual character are generated without having to employ an actor or schedule the actor for one or more sessions. Once activated, the virtual camera is able to automatically capture the images of the virtual character represented by the rig. The image capturing is done in a fraction of time of the manual process. Further, the virtual markers remain fixed in position on the face of the rig representing the virtual character and the movement of the virtual markers is synchronized with the movement of the head of the virtual character and there is no risk of the virtual markers drifting away or fading or dislocating, resulting in reliable marker tracking. The expressions derived from the marker tracking are more consistent and reliable. Since the virtual camera is disposed within the virtual scene and is de-coupled (i.e., not coupled) from the head of the virtual character, stabilization issues resulting from the coupling is eliminated. In some implementations, multiple virtual cameras may be disposed within the virtual scene, with each virtual camera used to track virtual markers disposed on the rig of a specific virtual character. In this implementation, the expressions of different virtual characters may be captured simultaneously using the different virtual cameras and the images captured by each virtual camera may be interpreted to generate re-mastered animation files for the respective virtual characters. The use of multiple virtual cameras enables generation of the re-mastered animation files of a plurality of virtual characters in a fraction of time.

With the general understanding of the disclosure, specific embodiments will now be described with reference to the various drawings.

FIG. 1 illustrates a simplified process flow followed for capturing expressions of a virtual character to generate re-mastered animation files for the virtual character, in one implementation. The process begins at step 1 wherein an animation processor executing on a server, such as a cloud server, accesses game files of a video game title and identifies a virtual character C1 used in the video game. In addition to identifying the virtual character C1, the animation processor is also used to identify a rig R1 used to represent the virtual character C1. The game files may be maintained on the game server that is part of the game cloud system and accessed over a network, such as an Internet, or may be a stand-alone game server or a game console. The game server may store game files of a plurality of video game titles. The game files of a video game include game code, game content (e.g., virtual game scene, etc.), a plurality of virtual objects, a plurality of virtual characters, and animation files capturing animation of the plurality of virtual objects, virtual characters. The animation files of the virtual objects, virtual character of the video game are used to generate gameplay data, when the video game is selected for gameplay. In addition to the game code and animation files, the game files may also include other game content (e.g., gameplay data), generated when the video game is executed. The gameplay data provides game state of the video game based on game input from one or more users.

A virtual character is represented within the video game using a character rig (or simply referred to as a "rig"). The rig includes two parts—a hierarchical set of interconnected parts called digital bones to define a bone structure (i.e., three-dimensional (3D) model), and a surface representation, called mesh or skin, used to cover the bone structure. The virtual character is animated using the process of rigging and skinning where the bone structure of the 3D model of the virtual character is manipulated like a puppet. Rigging is a process of creating the bone structure of the 3D model (i.e., rig) for the virtual character. Skinning is the process of binding an actual 3D mesh (i.e., skin) to the bones and joints of the rig—i.e., process of attaching vertices to the digital bones, so that the specific one or set of bones may be rotated or moved in a virtual scene by manipulating the vertices. The skin also provides the texture for the 3D model. A solver (e.g., inverse kinematics (IK) solver and/or forward kinematics (FK) solver) is used to perform the animation of the rig by determining and applying appropriate IK and/or FK values to the vertices to control the movement of specific ones of the bones within the bone structure, in accordance to defined IK and/or FK goals. The IK, FK values and IK, FK goals are determined from the animation files. In the case of facial expressions, the IK and/or FK goals may be to provide a certain expression on the face of the rig and the IK and/or FK values may define the extent to which the facial features of the rig have to be moved to provide the certain expression.

Continuing to refer to FIG. 1, the game files of the video game include a plurality of virtual characters (C1-CN). Each virtual character is represented by a distinct rig. For example, virtual character C1 is represented by rig R1, virtual character C2 is represented by R2, and so on. Each virtual character, C1, C2, etc., also includes corresponding animation files that were defined using the respective rig, R1, R2, etc. These rigs R1, R2, etc., that are currently stored in the game files are older rigs and the animation files of the virtual characters generated using the older rigs need to be re-mastered in order to improve the quality of the virtual characters included within. To re-master the animation files of virtual character C1, for example, the animation of the virtual character C1 expressed using the rig R1 need to be captured and applied to a new rig R1' created for the virtual character C1. Animation of a virtual character can be tracked using virtual markers applied to a corresponding rig. Accordingly, the process flows to step 2 where virtual markers VM are applied to the face of rig R1, in one implementation, to generate modified rig MR1 for virtual character C1 in order to capture the animation of the virtual character C1. These virtual markers are fixed on the face of the modified rig MR1 and do not move, fade away or get adversely affected by the movement of the face of the modified rig MR1. In addition to applying the virtual markers VM to the face of the rig R1, additional virtual markers VM may be applied to other body parts of the rig R1 to generate the modified rig MR1, so that the animation of those body parts can be captured as well. Once the virtual markers are applied, animation files for the virtual character C1 are identified and executed. The virtual markers VM on the modified rig MR1 of virtual character C1 are tracked, during execution of the animation files, to capture the animation expressed on the face of the modified rig MR1.

At step 3, a virtual camera VC1 disposed within a virtual scene of the video game in which the virtual character C1 is present, is activated, and at step 4, the animation files corresponding to the virtual character C1 are executed using the modified rig MR1, so that the activated virtual camera VC1 can capture images of animation expressed on the face of the modified rig MR1. The images captured by the virtual camera VC1 include data related to virtual markers VM tracking (step 4a) and data related to expression tracking (step 4b). The virtual marker tracking captures changes to the position of the various virtual markers on the face of the modified rig MR1 as the animation files are being executed. The expression tracking captures changes to the facial features of the modified rig MR1. The data from the virtual marker tracking are used to determine the expressions exhibited on the face of the virtual character C1 and the data from the expression tracking may be used to fine tune the expressions when defining the new animation files (i.e., re-mastered animation files) for the virtual character C1. The images related to the marker tracking (step 4a) and expression tracking (step 4b) of virtual character C1 as captured by the virtual camera VC1 are stored alongside the animation files captured using rig R1 of virtual character C1. The number of images capturing the animation of the modified rig MR1 may be equal to or greater than the number of images capturing the animation of the rig R1 (i.e., 1-to-1 or 1-to-many) The additional images may be used to provide finer details of animation when applied to a new rig identified for the virtual character C1.

The virtual camera VC1 may be configured to capture the images in two-dimensions (2D) as well as three-dimensions (3D). To that effect, the virtual camera VC1 may be a stereoscopic camera, a digital camera, etc., that is capable of capturing the images in 3D. In one implementation, a single virtual camera VC1 may be used to capture the images of the animation of each virtual character. In alternate implementation, a plurality of virtual cameras VC1 may be used within the virtual scene, wherein each virtual camera VC1 may be used to capture images of animation of a modified rig MR1 of a specific virtual character. In this implementation, the animation of a plurality of virtual characters may be captured and the re-mastered animation files for each virtual character generated simultaneously.

The image files generated from the animation of the modified rig MR1 includes both 2D data and 3D data. At step 5, the 2D data is extracted from the image files for further processing. At step 6, for the 2D data extracted, a 2D solver is identified for applying the 2D data to a new rig identified for the virtual character C1. The solver may be configured as both a FK solver and an IK solver for providing appropriate values to a new rig identified for the virtual character C1 to generate animations, based on images of animation captured by the virtual camera. At step 7, a new rig R1' is identified for the virtual character C1. The new rig R1' is a high fidelity rig generated using latest tools and includes changes to the old rig R1 that encompasses various aspects. For example, the new rig R1' generated for the character C1 includes an increased amount of 3D expression shapes, improvement in the vertex amount of each shape, improved control setup, improved transitional in-between shapes and improved texture and mapping details, which can be used to improve the graphics of the animation when the data captured from the modified rig MR1 is applied to provide high fidelity animation. At step 8, the extracted 2D data is applied to the new rig R1' using the identified 2D solver. The 2D solver analyzes the 2D data, computes appropriate kinematic values (forward kinematic (FK) values and inverse kinematic (IK) values) in accordance to the goal defined from the analysis, and applies the computed kinematic values to the new rig R1' to cause animation of the new rig R1'. The animation files created by animating the new rig R1' are re-mastered animation files defined for the virtual character C1 as they are of higher fidelity (i.e., improved quality). The re-mastered animation files are stored in a datastore, such as game files datastore, for later retrieval by the game engine. The process of generating the re-mastered animation files is repeated for each virtual character used in the video game.

When a request to play the video game is received from a client device 100 of a user, the game engine retrieves the re-mastered animation files for the virtual character C1 and for other virtual characters used in the video game, from the datastore, as illustrated in step 9, and provides the re-mastered animation files to the game logic of the video game. The game logic uses the re-mastered animation files, during runtime of the video game, to generate the gameplay data, as illustrated in step 10. The gameplay data with the improved graphics of the virtual characters and the current game state of the video game is returned by the game logic to a client device of a user for rendering, in response to request for gameplay of the video game and in response to game inputs provided by the user during gameplay of the video game.

Figure 2:
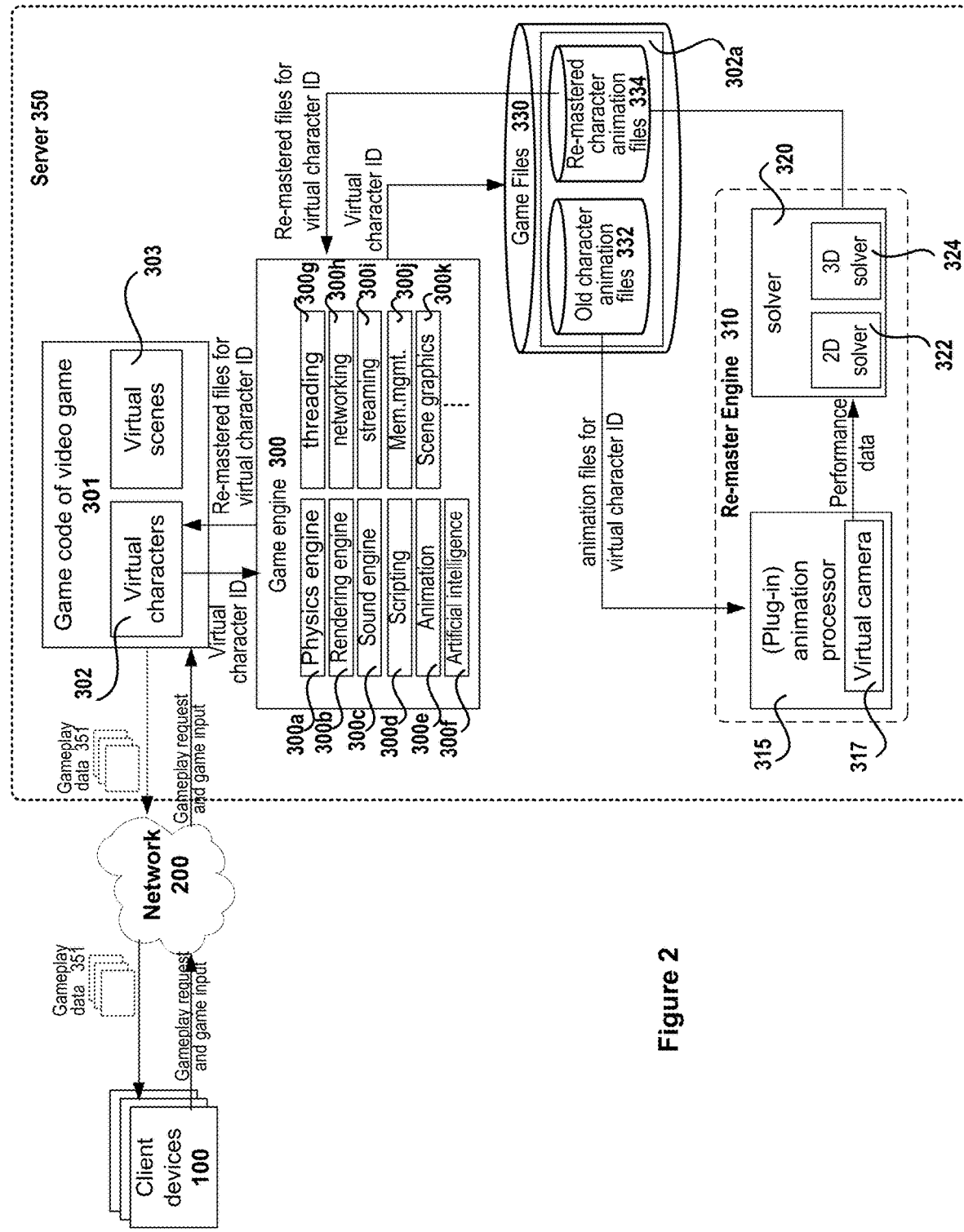
FIG. 2 illustrates a simplified block diagram of a system used for re-mastering files of a video game title, in accordance with one implementation of the present disclosure.

FIG. 2 illustrates a simplified block diagram of a system used to generate re-mastered files of virtual characters used in a video game, in one implementation. The system includes a server 350 on which game code of a video game 301 is stored and from where the game can be instantiated.

In one implementation, the server 350 may be a cloud server within a game cloud system and may run in a data center (not shown). The data center includes a plurality of servers that provide the necessary resources to host the video game and to generate video content stream (i.e., gameplay data) during gameplay of the video game. The generated gameplay data is compressed using compression techniques available to the server 350 and transmitted to the client devices 100 over the network 200. The game code of the video game 301 can be instantiated on one or more cloud servers 350 within one data center or distributed across multiple data centers, and, when instantiated on a plurality of cloud servers 350, the game data is synchronized across the plurality of cloud servers 350. The cloud server(s) 350 may include game code of a plurality of games that can be instantiated using resources of or available to the cloud server(s) 350. In alternate implementation, the server 350 may be a stand-alone server that is capable of executing an instance of the video game, or may be a server that is configured to manage one or more virtual machines that is capable of executing an instance of the video game to provide the gameplay data stream, wherein the streaming may be done in real-time or delayed time.

Alternately, the server 350 may include a plurality of consoles and the gameplay data stream may be accessed from one or more consoles (e.g., game consoles). The cloud server 350 may be independent consoles or may be rack-mounted server or a blade server. The blade server, in turn, may include a plurality of server blades with each blade having required circuitry and resources for instantiating a single instance of the video game, for example, to generate the gameplay data stream. Other types of cloud servers, including other forms of blade server may also be engaged for accessing the gameplay data stream or for executing an instance of the video game application that generates the gameplay data stream. During gameplay, the cloud server 350 receives game input from one or more users, updates the game state of the game and generates updated gameplay data. The updated gameplay data is provided to the users as frames of gameplay data stream.

The video game may be a multi-player game or a single-player game. A game engine 300 executing on the server 350 (e.g., cloud server or stand-alone server or game console) is communicatively connected to game logic of the video game to provide a framework for the video game. The game engine 300 is a software layer that serves as a foundation for the video game and provides the basic infrastructure (i.e., framework) for developing the video game. The game engine 300 abstracts the details of doing common related tasks (i.e., game engine tasks) required for every video game, while the game code of the video game 301 provides game logic detailing how the video game is to be played. The game code of the video game uses the modules included in the game engine 300 to control virtual objects including virtual characters and virtual scenes within the video game and to generate gameplay data 351.

Some of the basic core modules of the game engine 300 used by the game code of any video game includes a physics engine 300a (for collision detection, collision response, trajectory, movement of object based on gravity, friction, etc.), a rendering engine (i.e., a renderer) 300b for 2D and 3D graphics, sound engine 300c, scripting 300d, animation engine 300e, artificial intelligence 300f, threading 300g, networking 300h, streaming 300i, memory management 300j, scene graphics 300k, etc. These basic core modules of the game engine 300 are reusable by different video games to generate gameplay data based on game state of the video game. The generated gameplay data includes animation provided by the different virtual characters, wherein the animation is based on the context of the video game used in generating the gameplay data.

The generated gameplay data 351 for the video game is streamed, over a network 200, to the client devices 100 of users in data frames (for a streaming video game), in response to gameplay request and game input provided by one or more users using controls included in the client devices 100. The client devices 100 of users are communicatively connected to the server 350 over the network 200, such as the Internet. Each client device (100) has a processor, memory and communication capabilities to access the network 200 using wired, wireless, or 4G/5G communication, etc., and may be portable or not portable. The client devices 100 may run an operating system and include network interfaces or could be thin clients with network interface to access the network 200 in order to communicate with the server 350, wherein the server 350 provides the computation functions. The network 200 can be a 3G, 4G or 5G networks.

The client devices 100 having 5G communication capabilities are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to a local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

The gameplay data and game related animation files are stored in game files datastore 330. The game files datastore 330 includes game content (e.g., virtual characters, rigs representing the virtual characters used in the video game, game scenes, game code of the game, and animation files used for manipulating the virtual characters) of the video game. In addition to the animation of the virtual characters, the game files datastore 330 may also include animation of the virtual scenes included in the video game. The animation files pertaining to the virtual characters in the game files datastore 330 are stored in old character animation files datastore 332 and need to be re-mastered to improve the quality of graphics included therein. As a result, an animation processor 315 is used to retrieve the old animation files for each virtual character from the old character animation files datastore 332, which is part of the game files datastore 330, and re-master. The re-mastered animation files generated for each virtual character are stored in the re-mastered character animation files datastore 334 that is separate from the old character animation files datastore 332 that is used to store the old animation files.

In one implementation, the animation processor 315 is a plug-in processor (i.e., an add-on program) that is used to re-master the animation files used by the game logic of the video game. In this implementation, the animation processor 315 may be an add-on program of the game engine 300. In an alternate implementation, the animation processor 315 may be an add-on program that can be engaged via function-call from the game logic of the video game. In this implementation, the animation processor 315 may be called at the set-up stage of the video game after verifying that the re-mastered animation files for the virtual characters are not available in the game files datastore 330.

As part of re-mastering, each virtual character used in the video game is identified by the animation processor 315 using a virtual character identifier (ID). The animation processor 315 may query the game logic of the video game 301 to determine the virtual characters 302 used in the video game and to obtain the virtual character ID. The game logic of the video game 301 uses virtual characters 302 and virtual scenes 303 to generate gameplay data. The virtual character ID of each virtual character is used to retrieve the corresponding old animation files defined for the video game, from the old character animation files datastore 332. Some example animation processors 315 that can be used for re-mastering animation files include Maya™ (Autodesk), 3ds Max (Autodesk), Blender™ (The Blender Foundation), or Flash™ (Adobe). The animation processor 315 is not restricted to the aforementioned list but can use other animation processors that are well-known in the industry or that are newly developed.

The animation processor 315 identifies the virtual character C1 used in the video game using the virtual character ID and retrieves the animation files associated with the virtual character C1. The retrieved animation files are then executed. The animation files of the virtual character C1, when executed, causes a rig R1 representing the virtual character C1 to provide the animation. To capture the animation exhibited by the rig R1, virtual markers are applied to the face of the rig R1 representing the virtual character C1 to generate a modified rig MR1. Additional virtual markers may also be placed on other body parts of the rig R1 to track those body parts during execution of the animation files. The virtual markers on the modified rig MR1 are used to capture animation of facial features from which the different expressions can be determined, and when virtual markers are placed on the other body parts, animation of the various body parts (i.e., movement of joints represented by digital bones in the rig R1) as well.

Upon applying the virtual markers, the animation files are executed by the animation processor 315 using the modified rig MR1. The animation files provide the kinematic values that move the different facial features and the body parts. A virtual camera (VC1) 317 available to the animation processor 315 and disposed within a virtual scene of the video game, is activated to capture images of the animation performed by the modified rig MR1 representing the virtual character C1. The activated virtual camera 317 tracks the virtual markers placed on the face and, when available, on the other body parts of the modified rig MR1 of the virtual character C1. The virtual camera 317 may be a stereoscopy enabled digital camera that is capable of capturing images of the animation of the modified rig MR1 in both 2D and 3D. In addition to tracking the virtual markers, the expressions on the face of the modified rig MR1 of the virtual character C1 may also be tracked by the virtual camera 317.

The image data obtained by tracking the virtual markers and the expressions on the modified rig MR1 define the performance data. The performance data is then fed to a solver 320 as input. In one implementation, the solver 320 includes a two-dimensional (2D) solver 322 and a three-dimensional (3D) solver 324. When 2D re-mastered animation files are to be generated, the 2D solver 322 is used. In this case, the 2D data is extracted from the performance data and provided as input to the 2D solver 322. Similarly, when 3D re-mastered animation files are to be generated, the 3D solver 324 is used. In this case, the 3D data is extracted from the performance data and provided as input to the 3D solver 324. The solver 320 (either 2D solver 322 or 3D solver 324) uses the 2D or 3D data to determine kinematic values that is to be applied to the face of a new rig created to represent the virtual character C1. The new rig R1' generated for the virtual character C1 is a high fidelity rig and includes finer details of the bone structure and a densely defined skin to capture finer details of the various features of the virtual character C1. For example, the new rig R1' includes increased number of 3D expression shapes, improved vertex amount for each shape, improved rig control setup, improved transitional in-between shapes, and improved texture and mapping details. The solver 320 applies the kinematic values to the facial features of the new rig R1' of virtual character C1 to capture the expressions (i.e., animations) on the face of the new rig R1'. The expressions captured on the new rig R1' by applying the kinematic values determined by the solver 320, defines the re-mastered animation files for the virtual character C1. The animation of the body parts of the new rig R1' may also be captured in a manner similar to capturing of animation on the face of the new rig R1'. The re-mastered animation files are stored in the game file datastore 330 separately in re-mastered character animation files datastore 334. The old character animation files datastore 332 and the re-mastered character animation files datastore 334 are part of the character animation files datastore 302a. The re-mastered animation files for each of the virtual characters is generated by the animation processor 315 and stored in the re-mastered character animation files datastore 334 for subsequent use by the game logic of the video game. The animation processor 315 together with solver 320 constitute re-master engine 310.

When a request for gameplay of the online game is received at the server 350, the server executes an instance of the game code of the video game 301. The game code of the video game 301 uses the infrastructure of the game engine 300 and the re-mastered animation files defined for each of the virtual characters used in the video game to generate gameplay data for forwarding to the client devices 100 of one or more users. Game input from the users is used to update the game state of the video game. Based on the game state, the gameplay data transmitted to the client devices is also updated. The updated gameplay data includes updates to expressions on the face of the rigs representing the virtual characters, which are obtained from the re-mastered character animation files, wherein the updates to expressions of the virtual characters are based on the current context of the game. The gameplay data transmitted to the client devices include high fidelity images of the virtual characters that are of improved quality (i.e., improved pixel-wise resolution, and exhibits more realistic static facial features and dynamic movements) as they are generated using the high fidelity rigs.

Figure 3:
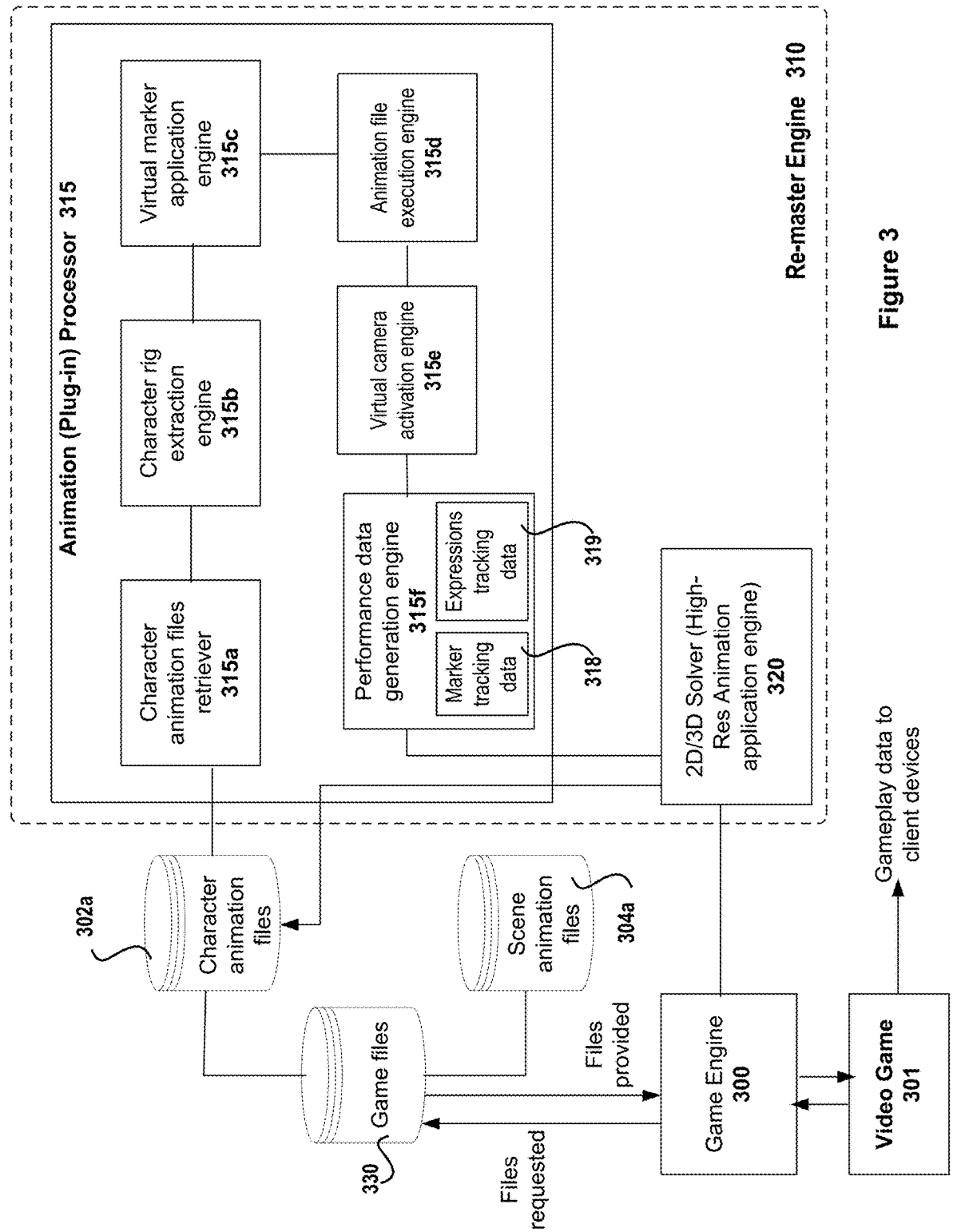
FIG. 3 illustrates a simplified block diagram of the different sub-modules within an animation processor used to generate re-mastered animation files associated with a plurality of virtual characters, in accordance with one implementation of the disclosure.

FIG. 3 illustrates a simplified representation of an animation processor 315 used for re-mastering the animation files of virtual characters used in a video game, in one implementation. The animation processor 315 includes a plurality of sub-modules, with each sub-module playing a role in the re-mastering process. In the implementation illustrated in FIG. 3, the animation processor 315 includes a character animation files retriever sub-module 315a, a character rig extraction engine 315b, a virtual marker application engine 315c, an animation file execution engine 315d, a virtual camera activation engine 315e and a performance data generation engine 315f. Of course, the aforementioned sub-modules are provided as examples and should not be considered exhaustive. Further, one or more of the sub-modules may be combined together. It should be noted that engine, module and sub-module are used interchangeably in this application to define a software program that includes program code to perform specific function(s). The animation processor 315 is communicatively connected to the game files datastore 330 to retrieve and update character animation files of virtual characters of each video game stored therein. The game files datastore 330 may include data related to a plurality of video games with data pertaining to each of the plurality of video games maintained separately. The game files datastore 330 includes, among other data (e.g., game code, gameplay data, etc.), character animation files 302a and scene animation files 304a. The character animation files 302a stores animation files pertaining to different virtual characters used in the video game and the scene animation files 304a stores animation files for the different virtual scenes used in the video game. The character animation files for each virtual character used in a video game may be generated using some of the modules provided by the game engine 300, such as animation engine 300e, physics engine 300a, sound engine 300c, scripting 300d, artificial intelligence 300f, scene graphics 300k, etc.

The re-mastering of the animation files of each virtual character of a video game is performed by first querying and receiving animation files of a virtual character C1 used in the video game. The character animation files retriever 315a of the animation processor 315 generates a query to the character animation file 302a using virtual character identifier (ID) of the virtual character C1. The virtual character and the virtual character ID may be obtained by querying the game code of the video game or the game engine. Responsive to the query from the character animation files retriever 315a, the animation files of the virtual character C1 is forwarded to the animation processor 315. The animation files of the virtual character C1 were generated using a rig R1 representing the virtual character C1. The rig R1 is an older rig and the animation files of the virtual character C1 was captured using the older rig R1. The animation files generated using the older rig R1 is of poor graphic quality as the older rig R1 was developed, for example, to include lower density facial features/skin, less 3D expression shapes, minimal rig control setup. These animation files have to be re-mastered to improve the graphic quality. To accomplish this, the animation files of the virtual character C1 are brought into the animation processor 315 to be re-mastered.

In addition to retrieving the animation files of a virtual character C1, the animation processor 315 also retrieves the rig R1 that was used to represent the virtual character C1 and used in generating the animation files. A character rig extraction engine 315b of the animation processor 315 is used to request and retrieve the rig R1 associated with the virtual character C1. The various rigs used to represent the different virtual characters used in the video game may be stored alongside the corresponding animation files within the character animation files 302a and the character rig extraction engine 315b may query the character animation files 302a to obtain the rig R1 used for the virtual character C1. The retrieved rig R1 of the virtual character C1 is forwarded to the virtual marker application engine 315c for further processing.

The virtual marker application engine 315c is used to apply virtual markers on the face of the rig R1 to generate a modified rig MR1 for the virtual character C1. The virtual markers on the face of the modified rig MR1 are used to track the expressions exhibited by the virtual character C1 when animation files are executed. In addition to applying virtual markers on the face, the virtual marker application engine 315c may also apply virtual markers on other body parts of the rig R1 so that animation of the other body parts may also be tracked. The modified rig MR1 of virtual character C1 with the applied virtual markers is used in place of the rig R1 during animation.

The animation files for the virtual character C1 retrieved from the character animation files 302a are then executed—i.e., applied to the modified rig MR1. The animation file execution engine 315d is configured to detect the modified rig MR1 with the applied virtual markers generated for the virtual character C1 and execute the animation files using the modified rig MR1. The execution includes using the information from the retrieved animation files for the virtual character C1 to identify the kinematic values (e.g., FK and IK values) for animating the modified rig MR1 identified for the virtual character C1, and applying the kinematic values to the modified rig MR1 to allow the modified rig MR1 to perform the animation.

To capture the animation of the modified rig MR1, a virtual camera 317 (VC1) disposed within the virtual scene of the video game, is activated. The virtual camera is part of the animation processor 315, which is a plug-in processor. A virtual camera activation engine 315e of the animation processor 315 is used to detect the execution of the animation files and to activate the virtual camera 317 to capture the animation. The virtual camera activation engine 315e is configured to control the location and direction of the virtual camera as well as activation and deactivation of the virtual camera. The activated virtual camera 317 is controlled to face the modified rig MR1 and move so as to synchronize with the movement of the head of the modified rig MR1, during animation of the modified rig MR1. The controlled movement allows the virtual camera 317 to track the virtual markers on the face and, where available, on other body parts of the modified rig MR1 and capture images of the virtual markers. The captured images track the virtual markers and are used to define the performance data related to the animation of the modified rig MR1. In addition to tracking the virtual markers, the virtual camera 317 also tracks the expressions and changes in the expressions exhibited on the face of the modified rig MR1. As mentioned previously, the virtual camera 317 may be a stereoscopy enabled digital camera that is configured to take both 2D and 3D images of the animation. The images captured by the virtual camera 317 are forwarded to a performance data generation engine 315f for processing.

The performance data generation engine 315f receives the images captured by the virtual camera 317 and analyzes the performance data to identify the data that correspond to the virtual marker tracking 318 and expressions tracking 319. Further, the marker tracking/expression tracking data is processed to identify the 2D data and the 3D data. The performance data is provided to a solver module (also referred to simply as "solver") 320. The solver 320 is a high resolution animation application engine that is configured to extract the 2D data or the 3D data from the performance data and apply the data to a new rig R1' created for the virtual character C1. Toward this end, the solver 320 includes a 2D solver that is configured to process the 2D performance data and a 3D solver that is configured to process the 3D performance data. When generating re-mastered animation files for the virtual character C1, the 2D solver is configured to extract the 2D performance data, retrieve a new rig R1' defined for the virtual character, and apply the 2D performance data to the new rig R1'. Applying the 2D performance data includes computing kinematic values (both forward kinematics (FK) and inverse kinematics (IK) values) for the captured 2D performance data and applying the identified kinematic values to the new rig R1', so that the new rig R1' performs the animation. The new rig R1' for the virtual character C1 is created to include more details (e.g., more dense skin) that can be used to provide high fidelity facial features, for example. The images captured by the virtual camera 317 during animation of the modified rig MR1 are used to compute the kinematic values for applying to the new rig R1'. Since the new rig R1' includes greater amount of expression shapes, improved vertex amount for manipulating each shape, improved rig's control setup, improved shape transitions, and texture and mapping details, the kinematic values computed for the new rig R1' take these improved features and controls into consideration. Consequently, the 2D solver may take the finer details included in the new rig R1' and compute greater number of kinematic values for manipulating and/or controlling the expression shapes, vertices of each shape, transitions between the shapes of the new rig. The computed kinematic values, when applied, capture finer detailed animation of facial features of the new rig R1'. The animation files thus generated define the re-mastered file and provide more detailed and improved graphics (i.e., high fidelity animation images) than what was rendered using the old rig R1.

The kinematic values, when applied to a rig of a virtual character, track a range of motion involved in exhibiting the different expressions and accordingly specify an amount of displacement for different body parts (e.g., facial features, legs, arms, etc.), angle of orientation of the different body parts or segments, angles of joints, gait parameters, etc., to provide a realistic animation of the rig by capturing realistic static facial expressions and dynamic movements. The animation processor 315 includes algorithm that uses dots-to-image information obtained from tracking the virtual markers, linear regression, principle component analysis (PCA) and other mathematical principles to define an extent to which the facial features have to be moved in order to provide realistic animation of the virtual character. Based on the algorithm, kinematic values are computed. In one implementation, the algorithm may be a machine learning algorithm that is used to create a model (e.g., an artificial intelligence model) that includes features of the virtual character and the various expressions exhibited by the virtual character as nodes and the relationship between the expressions and the features of the virtual characters as edges between two consecutive nodes. The model is continuously trained to capture changes in the expressions of the virtual characters, based on the context of the video game. The trained model is used to compute kinematic values to set for the features identified in the new rig in order to achieve a desired expression for the virtual character. As more and more expressions expressed by the virtual character are detected, the model is trained to identify the tracking data (virtual marker tracking data and expression tracking data) in order to achieve different kinematic goals. Using the tracking data of the model as input and the different kinematic goals as the output, various kinematic values are computed and used to set the features identified in the new rig in order to achieve the kinematic goals. As previously mentioned, a higher number of kinematic values may be computed to capture the finer detailed expressions and movements of the new rig.

The kinematic values include forward kinematics (FK) values and inverse kinematic (IK) values that are used to apply to the bones and to the skin of the rig. The rig, when defined, includes a set of digital bones with the parent bone followed by the child bone, and a skin structure, which when manipulated, is used to control movement of the digital bones. In forward kinematics, the child bone follows the parent bone's behavior. Whereas in the inverse kinematics, the bone structure moves up in reverse skeleton hierarchy. In the inverse kinematics, a target bone is identified in the bone structure and an angle between the two bones—i.e., between the target bone and the parent bone of the target bone is calculated to achieve the expected movement or orientation of the target bone. Computation of the FK and IK values and applying the FK and IK values to a rig are well-known in the art and are not described in detail in this application.

The animation files obtained by applying the FK and IK values determined by the 2D solver to the new rig R1' provides realistic animation of the virtual character C1 and is stored as re-mastered animation files in the character animation files 302a and made available to the game engine 300 and the game code of the video game 301. The re-mastered files are stored separately alongside the corresponding old animation files for each of the game character for each video game and made available when gameplay data is to be generated to include virtual character of the video game. The old animation files are stored and used for generating the re-mastered files, while the re-mastered animation files are used for generating the gameplay data. Thus, when a request for gameplay of the video game is received from a user, the game code of the video game queries the game engine 300 to provide the re-mastered animation files for the virtual characters used in the video game and other game content, such as virtual scenes 303. The game engine retrieves the re-mastered animation files from the game files datastore 330 along with scene animation files 304a for the virtual scenes 303 and other game content and makes it available to the game code, during runtime, for generating the gameplay data. Depending on the context of the gameplay of the video game, appropriate animation files of the virtual character is retrieved by the game engine and made available to the game code to generate the gameplay data. The re-mastered animation files for the virtual character C1 included in the gameplay data are of improved quality (i.e., high fidelity) than the old animation files for the virtual character C1. The gameplay data with the improved graphics of the virtual characters of the video game are forwarded to the client devices of the users for rendering. The video game may be a streaming online video game. In such cases, the gameplay data with the improved graphics of the virtual character are forwarded as frames of data for rendering, wherein the gameplay data is generated on-the-fly, based on the input received from the users.

To further enhance the quality of the animation of the virtual character, color or texture may be applied to different facial features and, where available, to the different body parts of the new rig R1', specifically for the body parts that are undergoing changes, to make the facial features and parts of the body appear more realistic and natural during animation. For example, different color shading may be provided to certain portions of the body to capture effect of lighting on the different body portions based on the direction these body portions are facing in relation to the virtual camera, direction of motion of these body portions, amount of animation occurring that involves the different body portions, etc. Similarly, texturing may be applied to provide realistic representation of the various features during animation of the virtual character. In addition to coloring and texturing, one or more shapes may be blended to the facial features, for example, to capture or correct depth related attribute of the facial feature on the new rig R1' of the virtual character. The 2D solver, for example, is able to identify the finer details of color, texture, shapes that need to be applied to the new rig and compute kinematic values accordingly for applying to the different expression shapes, vertices of each shape, additional shapes for blending with the facial features and other body portions of the new rig R1' to make the animation of the virtual characters more realistic.

Similar process may be used to generate 3D animation files using 3D solver. The 3D solver extracts and uses 3D performance data for creating the 3D animation files for the virtual character. The 3D animation files include the depth and other finer details. As such, in the implementation that uses the 3D solver to generate 3D animation files, additional processing to apply color and texture may not be needed as the 3D animation files may include the finer details that the texture and color would provide. In alternate implementations, the 3D animation files may be further processed to apply additional color and texture (e.g., to additional shapes applied) to improve the quality of the images of the virtual character. The 2D solver and the 3D solver use the images of the rig representing the virtual character performing the animations rather than capturing the images of an actor performing the actions.

The animation files thus re-mastered using an improved rig and images captured from a virtual camera include improved and realistic expressions and movements, wherein the improved expressions and the movements exhibited by the virtual character are based on the context of the video game. The improved rig includes an improved skeletal bone structure with greater number of bones and joints (i.e., representing 3D expression shapes), and an improved mesh or skin to cover the bone skeletal bone structure. The improved mesh or skin includes greater number of vertices defining each shape that can be used to move the bones and joints of the skeletal bone structure using the improved rig control setup. The mesh or skin of the new rig is very tight and finely defined making it possible to capture the finer details of the various expressions expressed by the virtual characters. The transitional in-between shapes and the texture and mapping details of the new and improved rig allow for more realistic transition from one expression to another and during movements of the virtual character. The usage of the virtual camera of the animation processor deployed within virtual scene of the video game allows de-coupling of the camera from the head of the virtual character, thereby preventing stabilization issues. The virtual markers that are applied to the rig for tracking is fixed in the position it is applied and does not drift or fall off, allowing for more reliable tracking of the various expressions, and the number of virtual markers applied to the face of the rig may be increased to capture finer details of facial features, for example.

Figure 4A:
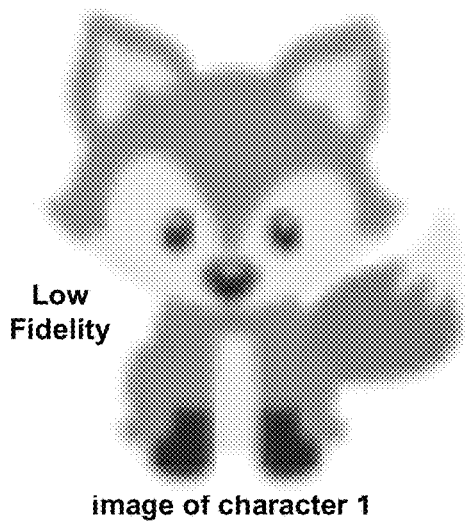
FIG. 4A illustrates an image of a virtual character 1 that needs to be re-mastered to improve content quality, in accordance with one implementation of the present disclosure.
Figure 4B:
FIG. 4B illustrates an image of the virtual character 1 of improved content quality resulting from re-mastering animation files, in accordance with one implementation of the present disclosure.
Figure 4C:
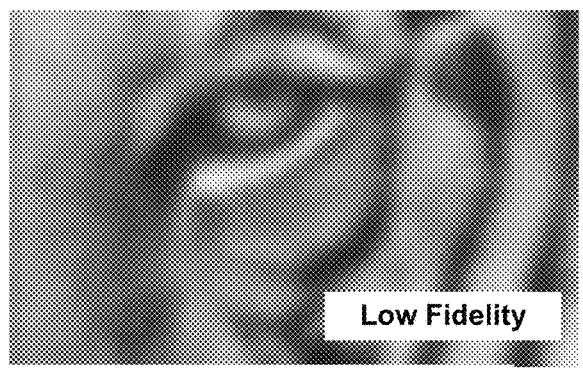
FIG. 4C illustrates an image of a virtual character 2 that needs to be re-mastered to improve content quality, in accordance with one implementation of the present disclosure.
Figure 4D:
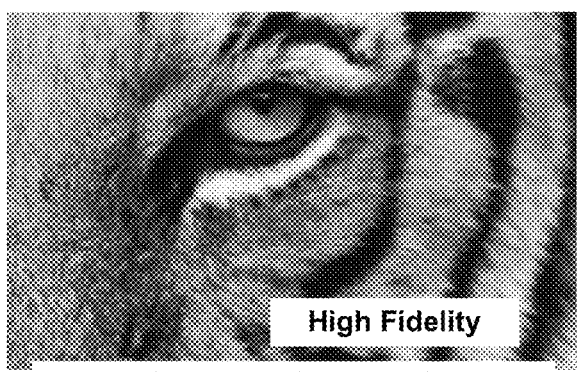
FIG. 4D illustrates an image of the virtual character 2 with improved quality as a result of re-mastering, in accordance with one implementation of the present disclosure.
Figure 4E:
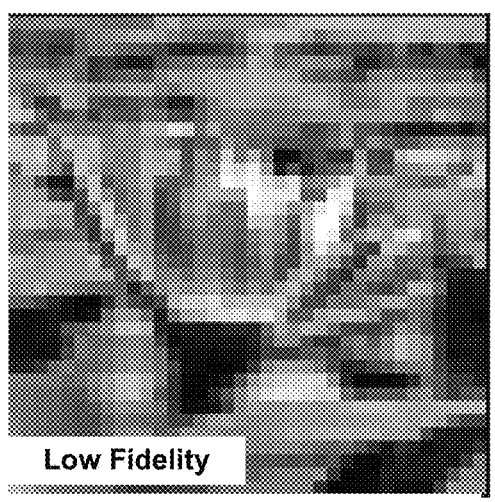
FIG. 4E illustrates an image of a virtual object 1 that needs to be re-mastered to improve content quality, in accordance with one implementation of the present disclosure.
Figure 4F:
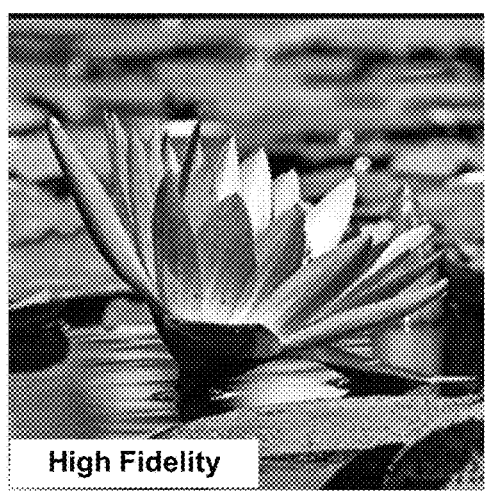
FIG. 4F illustrates an image of the virtual object 1 with improved quality as a result of re-mastering, in accordance with one implementation of the present disclosure.

FIGS. 4A-4F illustrate the different virtual characters and/or virtual objects that can be re-mastered using the animation processor 315, in some example implementations. FIG. 4A illustrates an image of a face of a virtual character 1 that was captured in low fidelity and was part of the old animations files generated using the old rig. FIG. 4B illustrates an image of the face of the same virtual character 1 illustrated in FIG. 4A, but captured in high fidelity using the new rig that is part of the re-mastered animation file for the virtual character. Similarly, FIG. 4C illustrates the image of a virtual character 2 that is part of the animation files for the virtual character 2 captured using the old rig. The image shown is of low fidelity. FIG. 4D illustrates an image of the same virtual character 2 that was generated using the new rig for the virtual character 2 and is part of the re-mastered animation files. The re-mastered animation of the virtual character 2 using the new rig is of high fidelity (i.e., improved fidelity). The re-mastering of the animation files may be done for virtual objects, such as the one shown in FIGS. 4E and 4F. FIG. 4E illustrates an image of the virtual object 1 that is captured in low fidelity using the old rig and that is part of the old animation files associated with the virtual object 1. FIG. 4F illustrates an image of the same virtual object 1 that is captured in high fidelity using the new rig and that is part of the re-mastered files of the virtual object 1. As shown, finer details can be captured using the new rig by applying the animation details captured by the virtual camera in the images of the respective virtual characters or virtual objects.

Figure 5:
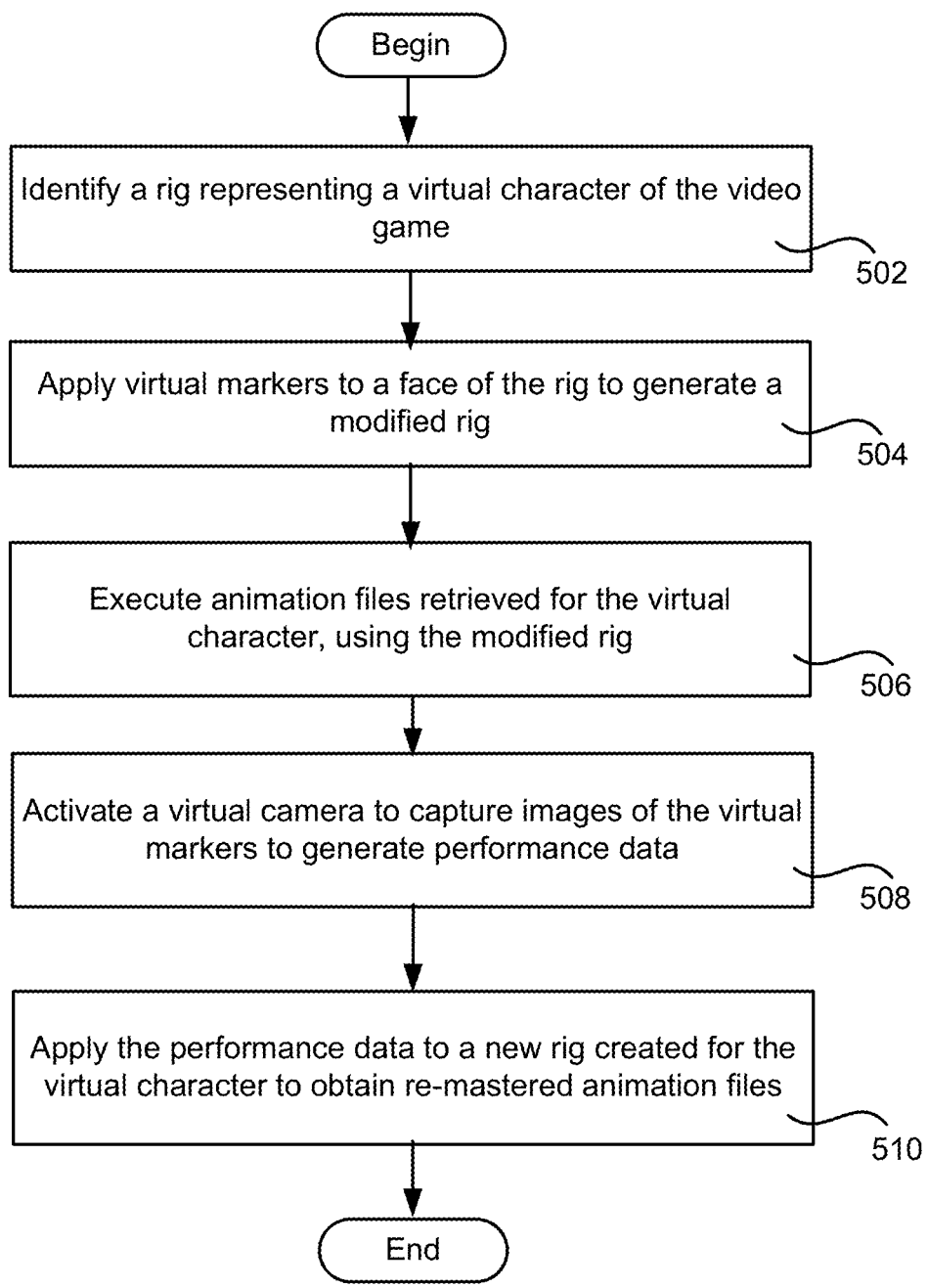
FIG. 5 illustrates flow operations of a method for re-mastering animation files of virtual characters used in a video game, in accordance with one example implementation of the present disclosure.

FIG. 5 illustrates flow of operations of a method used in re-mastering animation files of a virtual character used in a video game, in one implementation. The method begins at operation 502 wherein a rig R1 representing the virtual character C1 is identified. The rig is an older version rig that includes less features (less expression shapes, fewer vertices of each shape for manipulation, fewer texture and mapping details, etc.). The rig R1 includes a bone structure made of bones and joints and a mesh (i.e., skin) to cover the bone structure. The mesh includes fewer vertices that can be moved during animation to move the bones and joints of the rig. Further, the mesh of the old rig includes fewer expression shapes, fewer texture and mapping details, etc.). Virtual markers are applied to the rig R1 to generate a modified rig MR1, as illustrated in operation 504. In one implementation, the virtual markers are applied to the face of the rig R1 to capture facial features and changes in the facial features during animation. The virtual markers are fixed in the initial position and do not move (i.e., drift away) or fade away with the movement of the head of the rig, during animation. In another implementation, virtual markers are applied to both the face and other body parts of the rig R1 to capture changes to facial features and body movement.

The process then proceeds to operation 506 wherein animation files for the virtual character are identified and retrieved. The animation files for the various virtual characters of the video game are stored in a game files datastore 330 as part of character animation files 302a and retrieved by querying the game engine 300, for example. An animation processor 315 (i.e., a plug-in processor) may be used to initiate the query to the game engine 300, during re-mastering of the animation files for the video game. The animation processor 315 may be a plug-in processor to the game engine 300 or may be a plug-in processor to the game code of the video game. The retrieved animation files provide the animation related to the different expressions that the virtual character can make in the video game. In addition to expressions, the animation files may also include changes in the movement of the different body parts of the virtual character C1 as the virtual character C1 interacts in the video game. The retrieved animation files for the virtual character C1 are executed using the modified rig MR1 that includes the virtual markers.

A virtual camera 317 disposed within a virtual scene of the online game in which the virtual character C1 is present, is activated, as shown in operation 508. The virtual camera 317 is configured to capture images of the virtual markers applied on the modified rig MR1 as the modified rig MR1 is being animated using the animation files of the virtual character C1. The animation files specify the kinematic values that have to be applied to the different features of the modified rig MR1 to generate animation, as illustrated in operation 510, to obtain re-mastered animation files. The virtual camera tracks the virtual markers of the modified rig MR1 as the modified rig MR1 is being animated, to define performance data. The images captured by the virtual camera include both 2D and 3D data. In one implementation, a 2D solver is used to extract the 2D data included in the performance data, compute the kinematic values pertaining to the various features identified in the 2D data, and apply the computed kinematic values (e.g., forward and inverse kinematic values) to a new rig R1' defined for the virtual character, as illustrated in operation. The number of kinematic values computed by the 2D solver for applying to the new rig may be greater than the kinematic values that were included in the old animation files. This may be due to the fact that the 2D solver is computing the kinematic values for additional features identified in the new rig. For instance, the 2D solver may refer to the new rig's control setup to identify the additional features (e.g., additional 3D expression shapes), additional vertices for manipulating each shape (e.g., expression shape) and the transitional in-between shapes, etc., that can be controlled in the new rig, and compute additional kinematic values for controlling these additional features, shapes, etc. The applied kinematic values provide the animation to the new rig R1'. The new rig R1' defined for the virtual character is a high fidelity rig that includes finer details of the skeletal bone structure and a tighter and dense mesh that covers the skeletal bone structure—i.e., increased number of 3D expression shapes, increased number of vertices for manipulating each shape and each transitional in-between shapes, improved new rig's control setup to identify and control the shapes and vertices, etc. The kinematic values computed for the improved bone structure and the mesh of the new rig R1' is applied to finely adjust the various facial features and body parts during animation. The resulting animation files are realistic in both static facial expressions and dynamic movements, and are stored in the game files datastore and retrieved by the game engine 300, during runtime, and provided to the game code of the video game. The game code uses the animation files of each virtual character to provide appropriate animation of the respective virtual characters when generating or updating the gameplay data. The appropriate animation is identified based on the context of the video game. The resulting gameplay data includes the animation of the virtual character in high fidelity (i.e., of improved quality).

The animation files generated for each virtual character may be further enhanced (i.e., fine-tuned) by applying color, texture, and/or by blending one or more shapes to the facial and/or other features of the new rig R1' to correct depth related attribute of the features, and to further enhance the realistic representation of the animation of the virtual character. The fine-tuned animation files of the virtual characters with improved graphics and realistic animation allow the users to have a rich and satisfactory gameplay experience of the video game.

Figure 6:
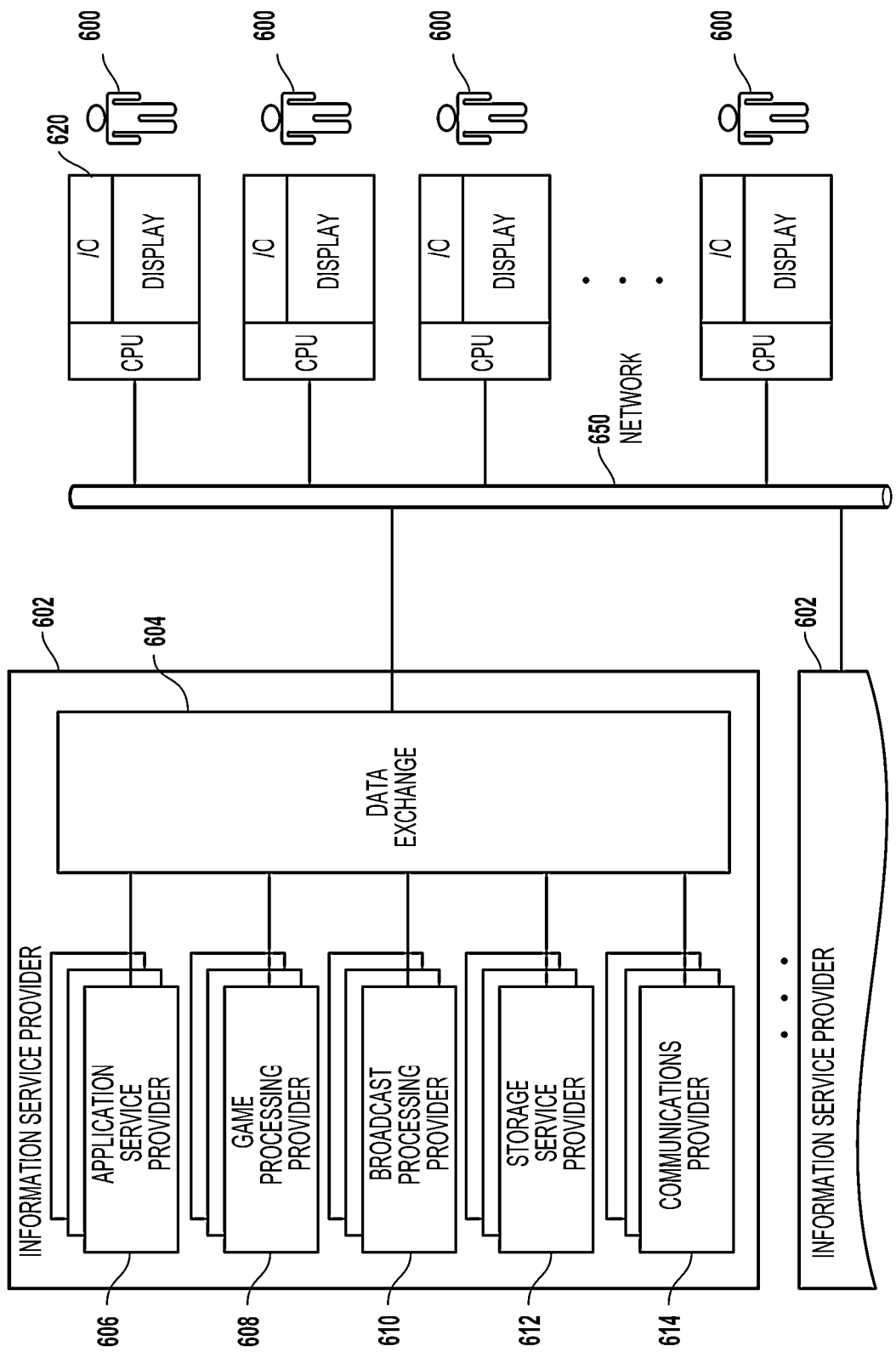
FIG. 6 illustrates an example implementation of an Information Service Provider architecture, in accordance with one implementation of the present disclosure.

FIG. 6 illustrates an embodiment of an Information Service Provider architecture. Information Service Providers (ISP) 602 delivers a multitude of information services to users (i.e., players) 600 geographically dispersed and connected via network 200. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 602 includes Application Service Provider (ASP) 606, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 602 includes a Game Processing Server (GPS) 608 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 610 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 612 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 614 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 604 interconnects the several modules inside ISP 602 and connects these modules to users 600 via network 650 (i.e., network 200 of FIG. 2). Data Exchange 604 can cover a small area where all the modules of ISP 602 are in close proximity, or can cover a large geographic area when the different modules are geographically dispersed. For example, Data Exchange 604 can include a fast Gigabit Ethernet (or faster) within a cabinet of a data center, or an intercontinental virtual area network (VLAN).

Users 600 access the remote services with client device 620 (i.e., client device 100 in FIG. 1), which includes at least a CPU, a memory, a display and I/O. The client device can be a PC, a mobile phone, a netbook, tablet, gaming system, a PDA, etc. In one embodiment, ISP 602 recognizes the type of device used by the client and adjusts the communication method employed. In other cases, client devices use a standard communications method, such as html, to access ISP 602.

Figure 7:
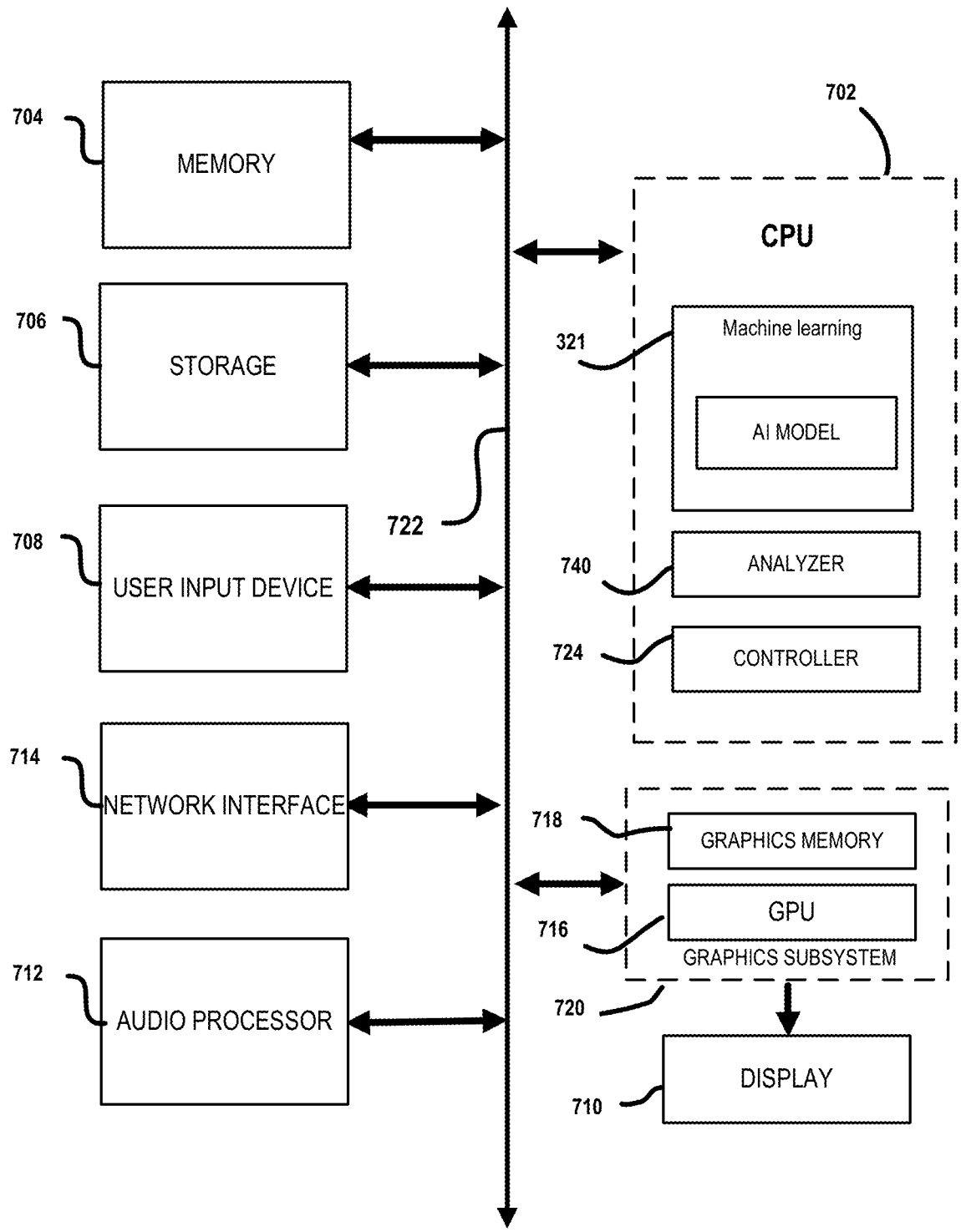
FIG. 7 illustrates a simplified block diagram of a game cloud server used for generating and accessing annotations for a video content stream generated by a producer, in accordance with one implementation of the present disclosure.

FIG. 7 illustrates components of an example computing device 700 that can be used to perform aspects of the various embodiments of the present disclosure. This block diagram illustrates a computing device 700 that can incorporate or can be a personal computer, video game console, personal digital assistant, a server 350 or other digital device, suitable for practicing an embodiment of the disclosure. FIG. 7 illustrates an exemplary computing device 700 with hardware components suitable for training an AI model that is capable of performing various functionalities in relation to a video game and/or game plays of the video game, in accordance with one embodiment of the present disclosure. Computing device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores.

Further embodiments can be implemented using one or more CPUs 702 with microprocessor architectures specifically adapted for highly parallel and computationally intensive applications, such as processing operations of interpreting a query, identifying contextually relevant resources, implementing and rendering the contextually relevant resources in a video game immediately, media and interactive entertainment applications, applications configured for deep learning, content classification, and user classifications. For example, CPU 702 may be configured to include a machine learning algorithm 321 (which includes an AI engine or deep learning engine) that is configured to support and/or perform learning operations with regards to providing various functionalities (e.g., predicting, suggesting) in relation to interactive applications (e.g., a video game (game play of the video game), streaming content applications, etc.). Further, the CPU 702 includes an analyzer 740 that is configured for analyzing the inputs and interactions and providing the results of the analysis for generating and training the machine learning model (AI model). The trained AI model provides an output in response to selection of particular set of annotation options, wherein the output is dependent on the predefined functionality of the trained AI model. The trained AI model may be used to identify an optimal set of annotation layers for dynamically overlaying over video content stream to generate the annotated video content stream for viewing. The annotated video content stream provides content enhancement that provide enriching viewing experience for spectators.

Computing device 700 may be localized to a player playing a game segment (e.g., game console), or remote from the player (e.g., back-end server processor), or one of many servers using virtualization in a game cloud system for remote streaming of gameplay to client devices (or simply referred to as "clients").

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to computing device 700, examples of which may include keyboards, mice, joysticks, touch pads, touch screens, handheld controllers, wearable controllers, still or video recorders/cameras, tracking devices for recognizing gestures, and/or microphones. Network interface 714 allows computing device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of computing device 700, including CPU 702, memory 704, storage 706, user input devices 708, network interface 714, and audio processor 712 are connected via one or more data buses 722.

A graphics subsystem 720 is further connected with data bus 722 and the components of the computing device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes three-dimensional (3D) rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from graphics memory 718 to be displayed on display device 710. Display device 710 can be any device capable of displaying visual information in response to a signal from the computing device 700, including CRT, LCD, plasma, and OLED displays. Computing device 700 can provide the display device 710 with an analog or digital signal, for example.

It should be noted, that access services, such as providing access to games or interactive applications of the current embodiments, delivered over a wide geographical area often use cloud computing. Cloud computing is a style of computing in which dynamically scalable and often virtualized resources are provided as a service over the Internet. Users do not need to be an expert in the technology infrastructure of the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server (e.g., cloud server 350) may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of PEs, each of which may reside on different server units of a data center.

According to this embodiment, the respective PEs for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a PE associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Users access the remote services with client devices, which include at least a CPU, a display and I/O. The client device can be a PC, a mobile phone, a netbook, a PDA, a mobile device, etc. In one embodiment, the network executing on the game server recognizes the type of client device used by a user and adjusts the communication method employed. In other cases, client devices use a standard communications method, such as html, to access the application on the game server over the internet.

It should be appreciated that a given video game or gaming application may be developed for a specific platform and a specific associated controller device (or simply referred to as "controller") 724. However, when such a game is made available via a game cloud system as presented herein, the user (e.g., player) may be accessing the video game with a different controller 724. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller 724 (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller 724 are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller 724. That is, the controller 724 communicates via a wireless or wired connection with the client device to transmit inputs from the controller 724 to the client device. The client device may in turn process these inputs and then transmit input data to the game cloud server via a network (e.g. accessed via a local networking device such as a router). However, in other embodiments, the controller can itself be a networked device, with the ability to communicate inputs directly via the network to the game cloud server, without being required to communicate such inputs through the client device first. For example, the controller might connect to a local networking device (such as the aforementioned router) to send to and receive data from the game cloud server. Thus, while the client device may still be required to receive video output from the cloud-based video game and render it on a local display, input latency can be reduced by allowing the controller to send inputs directly over the network to the game cloud server, bypassing the client device.

In one embodiment, a networked controller and client device can be configured to send certain types of inputs directly from the controller to the game cloud server, and other types of inputs via the client device. For example, inputs whose detection does not depend on any additional hardware or processing apart from the controller itself can be sent directly from the controller to the game cloud server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the game cloud server. These might include captured video or audio from the game environment that may be processed by the client device before sending to the game cloud server. Additionally, inputs from motion detection hardware of the controller might be processed by the client device in conjunction with captured video to detect the position and motion of the controller, which would subsequently be communicated by the client device to the game cloud server. It should be appreciated that the controller 724 in accordance with various embodiments may also receive data (e.g. feedback data) from the client device or directly from the game cloud server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for re-mastering animation files used in a video game, comprising:
   identifying a rig used for representing a virtual character of the video game;
   applying virtual markers to a face of the rig representing the virtual character to generate a modified rig;
   executing animation files retrieved for the virtual character of the video game to capture animation of the virtual character represented by the modified rig;
   activating a virtual camera to capture images of the virtual markers on the face of the modified rig during execution of the animation files to define performance data, the performance data tracks the virtual markers to capture changes to facial features of the modified rig of the virtual character as the animation files are being executed; and
   applying the performance data captured by the virtual camera to a new rig defined for the virtual character, to generate re-mastered animation files for the virtual character, the re-mastered animation files of the virtual character stored for subsequent retrieval by a game engine, during gameplay of the video game, for generating gameplay data for the video game,
   wherein the new rig is a high fidelity rig and the gameplay data generated for the video game includes animation of the virtual character in high fidelity.

2. The method of claim 1, wherein the performance data includes data related to tracking of expressions and data related to tracking of the virtual markers on the modified rig of the virtual character, the data obtained from tracking used to determine changes in expression of the virtual character.

3. The method of claim 1, wherein the performance data are captured as two-dimensional images and three-dimensional images.

4. The method of claim 1, wherein activating the virtual camera includes controlling a field of view of the virtual camera so as to be oriented toward the face of the modified rig representing the virtual character.

5. The method of claim 4, wherein controlling the field of view includes adjusting the field of view of the virtual camera so as to synchronize with movement of the face of the virtual character during execution of the animation files, the adjusting enabling the virtual camera to capture images of the virtual markers applied on the face of the modified rig.

6. The method of claim 1, wherein generating the gameplay data for the video game includes,
   identifying and applying the re-mastered animation files generated for a plurality of virtual characters of the video game, the gameplay data of the video game capturing changes in expression of the plurality of virtual characters in high fidelity.

7. The method of claim 1, wherein the performance data includes two-dimensional data and three-dimensional data.

8. The method of claim 7, wherein generating the re-mastered animation files includes,
   a. extracting the two-dimensional data from the performance data capturing animation of the virtual character using the modified rig; and
   b. applying the two-dimensional data to the new rig defined for the virtual character to generate the re-mastered animation files for the virtual character,
   wherein the extracting and applying is done using a two-dimensional solver.

9. The method of claim 8, wherein applying the performance data further includes enhancing the facial features of the virtual character in the new rig by applying color or texture to the facial features of the virtual character.

10. The method of claim 8, wherein applying the performance data further includes blending one or more shapes to the facial features captured in the re-mastered animation files of the virtual character, wherein the one or more shapes are identified and used to correct depth related attribute of the facial features of the virtual character.

11. The method of claim 7, wherein generating the re-mastered animation files includes,
   a. extracting three-dimensional data from the performance data capturing the animation of the virtual character using the modified rig; and
   b. applying the three-dimensional data to the new rig identified for the virtual character to generate the re-mastered animation files for the virtual character, the re-mastered animation files including depth related features,
   wherein the extracting and applying is done using a three-dimensional solver.

12. The method of claim 1, wherein generating the re-mastered animation files includes creating a model using machine learning algorithm, the model created using the facial features of the virtual character and expressions exhibited by the virtual character as nodes, and relationship between the expressions and the facial features of the virtual character as edges between two consecutive nodes, the model being trained to captured changes in the expressions of the virtual characters, based on context of the video game, the model used to compute kinematic values to set for the facial features identified in the new rig to define a specific expression on the face of the virtual character, wherein the specific expression is an output goal identified from the model of the virtual character.

13. A method for re-mastering animation files of a plurality of virtual characters used in a video game, comprising:
for each virtual character,
identifying, by an animation processor, a rig used for representing virtual character of the video game;
applying, by the animation processor, virtual markers to a face of the rig representing the virtual character of the video game to generate a modified rig;
executing, by the animation processor, animation files retrieved for the virtual character of the video game to capture animation of the virtual character represented by the modified rig;
activating, by the animation processor, a virtual camera to capture images of the animation expressed on the face of the modified rig of the virtual character as the animation files of the virtual character are being executed, to obtain performance data, the performance data of the virtual character capturing changes to facial features of the modified rig;
applying, by the animation processor, the performance data captured by the virtual camera to a new rig of high fidelity defined for the virtual character to generate re-mastered animation files for the virtual character, the re-mastered animation files of the virtual character stored for subsequent retrieval by a game engine of the video game; and
responsive to a request for gameplay of the video game,
retrieving, by the game engine of the video game, the re-mastered animation files of the plurality of virtual characters of the video game; and
generating, by the game engine, gameplay data for the video game, during the gameplay, using the re-mastered animation files generated using the new rigs of the virtual characters, the gameplay data for the video game capturing animation of each of the plurality of virtual characters of the video game in high fidelity.

14. The method of claim 13, wherein activating the virtual camera includes activating a plurality of virtual cameras simultaneously, each virtual camera of the plurality of virtual cameras is associated with a specific virtual character, a field of view of each of the plurality of virtual cameras controlled to face a respective virtual character to capture images of expressions exhibited by the respective virtual character, a movement of each of the virtual cameras is synchronized with movement of the face of the modified rig of the respective virtual character.

15. A system for re-mastering animation files used in a video game, comprising:
an animation processor configured to,
identify a rig used for representing a virtual character of the video game;
apply virtual markers to a face of the rig representing the virtual character of the video game to generate a modified rig;
execute animation files retrieved for the virtual character of the video game to capture animation of the virtual character represented by the modified rig;
activate a virtual camera to capture images of the animation expressed on the face of the modified rig of the virtual character as the animation files of the virtual character are being executed, to obtain performance data, the performance data of the virtual character captures changes to facial features of the modified rig;
a solver configured to,
apply the performance data captured by the virtual camera to a new rig of high fidelity defined for the virtual character to generate re-mastered animation files for the virtual character, the re-mastered animation files of the virtual character stored for subsequent retrieval; and
a game engine of the video game configured to,
retrieve the re-mastered animation files of the virtual character of the video game, during gameplay of the video game; and
generate gameplay data for the video game using the re-mastered animation files generated using the new rig of the virtual character, the gameplay data for the video game capturing animation of the virtual character of the video game in high fidelity.

16. The system of claim 15, wherein the animation processor and the game engine are executing on a cloud server of a game cloud system, wherein the animation processor is a plug-in processor that is communicatively connected to the game engine of the video game.

17. The system of claim 15, wherein the animation processor is configured to capture the performance data of the virtual character as two-dimensional data and three-dimensional data.

18. The system of claim 17, wherein the solver is a two-dimensional solver, the solver is configured to,
extract the two-dimensional data from the performance data; and
apply the two-dimensional data to the new rig defined for the virtual character to generate the re-mastered animation files for the virtual character.

19. The system of claim 18, wherein the solver is further configured to fine tune the facial features of the modified rig representing the virtual character by,
applying color to the facial features of the modified rig captured in the re-mastered animation files, or
applying texture to the facial features of the modified rig captured in the re-mastered animation files, or
blending one or more shapes to the facial features of the modified rig captured in the re-mastered animation files of the virtual character, wherein the one or more shapes are identified and used to correct depth related attribute of the facial features of the virtual character.

20. The system of claim 17, wherein the solver is a three-dimensional solver, the solver is configured to,
extract the three-dimensional data from the performance data capturing the animation of the virtual character using the modified rig; and
apply the three-dimensional data to the new rig identified for the virtual character to generate the re-mastered animation files for the virtual character, the re-mastered animation files including depth related attribute of the facial features of the virtual character.

* * * * *